(12) United States Patent
Yamagami (10) Patent No.: US 12,506,493 B2
(45) Date of Patent: Dec. 23, 2025

(54) AUDIO D/A CONVERTER, AND DSD SIGNAL D/A CONVERSION METHOD

(71) Applicant: ROHM CO., LTD., Kyoto (JP)

(72) Inventor: Shinji Yamagami, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 104 days.

(21) Appl. No.: 18/604,786

(22) Filed: Mar. 14, 2024

(65) Prior Publication Data

US 2024/0313799 A1    Sep. 19, 2024

(30) Foreign Application Priority Data

Mar. 14, 2023  (JP) .................. 2023-039916

(51) Int. Cl.
*H03M 1/66* (2006.01)
*G06F 3/16* (2006.01)

(52) U.S. Cl.
CPC ............... *H03M 1/66* (2013.01); *G06F 3/162* (2013.01)

(58) Field of Classification Search
CPC .................................. H03M 1/66; G06F 3/162
See application file for complete search history.

(56) References Cited

U.S. PATENT DOCUMENTS

| | | | | |
|---|---|---|---|---|
| 5,748,126 A * | 5/1998 | Ma | ......................... | H03M 3/508 341/143 |
| 6,476,990 B1 * | 11/2002 | Hansen | .................. | G11B 33/10 360/32 |
| 6,593,866 B1 * | 7/2003 | Eastty | ................. | H03M 7/3006 341/76 |
| 9,184,765 B1 * | 11/2015 | Wang | .................... | H03M 3/322 |
| 12,009,834 B2 * | 6/2024 | Lai | .......................... | H03M 1/66 |
| 2003/0021582 A1 * | 1/2003 | Sawada | ................ | G11B 27/105 386/241 |
| 2005/0117663 A1 * | 6/2005 | Drogi | ...................... | H04L 27/00 375/316 |
| 2005/0118977 A1 * | 6/2005 | Drogi | ....................... | H04B 1/40 455/323 |
| 2008/0279298 A1 * | 11/2008 | Ben-Yishai | ....... | H04L 25/03242 375/261 |
| 2010/0156867 A1 * | 6/2010 | Kim | ..................... | H03M 1/0682 341/145 |
| 2017/0336495 A1 * | 11/2017 | Davis | ........................ | G01S 7/35 |
| 2018/0054216 A1 * | 2/2018 | Sengoku | ............... | H04L 1/0041 |
| 2021/0211104 A1 * | 7/2021 | Kim | ......................... | H03F 1/305 |
| 2023/0188160 A1 * | 6/2023 | Matsuoka | ............. | H03M 3/502 341/126 |

FOREIGN PATENT DOCUMENTS

| | | | | |
|---|---|---|---|---|
| CA | 2680404 C | * | 11/2013 | ............ H03M 5/145 |
| CN | 1787070 A | * | 6/2006 | |
| CN | 101521040 A | * | 9/2009 | ............. G11C 7/222 |

(Continued)

*Primary Examiner* — Chico A Foxx
(74) *Attorney, Agent, or Firm* — CANTOR COLBURN LLP (57) ABSTRACT

An audio D/A converter for converting direct stream digital (DSD) data having a modulation rate m into an analog signal includes: an N-bit (N≥2) segment type D/A converter, a shift register configured to store M-bits (N≤MSN/m) of the DSD data; and a controller configured to supply an N-bit output code containing p 1s to the segment type D/A converter when the number of 1s stored in the shift register is p.

14 Claims, 9 Drawing Sheets

(56) References Cited

FOREIGN PATENT DOCUMENTS

| | | | | |
|---|---|---|---|---|
| JP | H02135978 A | * | 5/1990 | |
| JP | H04263300 A | * | 9/1992 | |
| JP | H0637640 A | * | 2/1994 | |
| JP | H08251040 A | * | 9/1996 | ............ H04M 9/082 |
| JP | H11259099 A | * | 9/1999 | |
| JP | 2017011358 A | * | 1/2017 | |
| KR | 920005247 B1 | * | 6/1992 | ............. G11B 20/18 |
| KR | 101446289 B1 | * | 10/2014 | |
| MY | 127515 A | * | 12/2006 | ......... H03K 17/6264 |
| WO | WO-9508221 A1 | * | 3/1995 | ................ H03L 7/08 |
| WO | WO-2004105233 A1 | * | 12/2004 | ............ H03M 1/825 |

* cited by examiner

AUDIO D/A CONVERTER, AND DSD SIGNAL D/A CONVERSION METHOD

CROSS-REFERENCE TO RELATED APPLICATION

The present invention claims priority under 35 U.S.C. § 119 to Japanese Patent Application No. 2023-039916, filed on Mar. 14, 2023, the entire content of which is incorporated herein by reference.

TECHNICAL FIELD

The present disclosure relates to audio signal processing, and particularly to a DSD signal reproduction technique.

BACKGROUND

Recently, in the related art of audio, high-resolution conversion of sound sources has been progressing. Under such circumstances, a format called direct stream digital (DSD) is becoming increasingly popular for network distribution of sound sources, and there is a demand for a reproduction device corresponding the DSD. A DSD system itself has existed in the related art and has also been used in a super audio CD (SACD) or the like.

The DSD system is a type of a pulse density modulation (PDM) in which an audio waveform is recorded as a 1-bit pulse-density-modulated bitstream. In principle, by passing the audio waveform through a low-pass filter, an original audio waveform can be reproduced.

Methods of reproducing a DSD format audio signal can be divided into two types, i.e., non-native reproduction and native reproduction. In the non-native reproduction, a DSD signal is first converted into a pulse code modulation (PCM) signal and then converted into an analog audio signal by a D/A converter.

On the other hand, in the native reproduction, a DSD signal is directly subjected to D/A conversion without being converted into a PCM signal, whereby the DSD signal is converted into an analog audio signal.

BRIEF DESCRIPTION OF DRAWINGS

The accompanying drawings, which are incorporated in and constitute a part of the specification, illustrate embodiments of the present disclosure.

DETAILED DESCRIPTION

Summary of Embodiments

A summary of some exemplary embodiments of the present disclosure will be described. This summary is intended to provide a simplified description of some concepts of one or more embodiments in order to provide a basic understanding of the embodiments as a prelude to the following detailed description, and is not intended to limit the scope of the present disclosure. This summary is not a comprehensive overview of all conceivable embodiments and is not intended to identify significant elements of all embodiments or to delineate the scope of some or all embodiments. For the sake of convenience, "an embodiment" may be used to refer to one embodiment (example or modification) or multiple embodiments (examples or modifications) disclosed in the present disclosure.

An audio D/A converter according to an embodiment of the present disclosure converts direct stream digital (DSD) data having a modulation rate m into an analog signal. The audio D/A converter includes an N-bit (N≥2) segment type D/A converter, a shift register configured to store M-bits (N≤M≤N/m) of the DSD data, and a controller configured to supply an N-bit output code containing p Is to the segment type D/A converter when the number of 1s stored in the shift register is p.

M bits extracted from the DSD data having the modulation rate of m contain M×m 1s at most. By counting the number of 1s contained in the M bits and controlling N segment type D/A converters, a signal level can be increased by M/N times.

In some embodiments, m may be 0.5, N may be 16, and M may be 32.

In some embodiments, the shift register may include M flip-flops connected in series.

In some embodiments, the shift register may include N flip-flops connected in series and (M−N) flip-flops connected in series.

In some embodiments, the shift register may include a first flip-flop group including N flip-flops connected in series to receive the DSD data, and a second flip-flop group including N flip-flops connected in series to receive the DSD data.

In some embodiments, the shift register may include a first flip-flop group including N/2 flip-flops connected in series to receive the DSD data, a second flip-flop group including N/2 flip-flops connected in series to receive the DSD data, a third flip-flop group including N/2 flip-flops connected in series to receive the DSD data, and a fourth flip-flop group including N/2 flip-flops connected in series to receive the DSD data.

In some embodiments, in the shift register, at least one selected from the group of the first flip-flop group to the fourth flip-flop group may be configured to receive delayed DSD data.

An audio D/A converter according to an embodiment of the present disclosure converts direct stream digital (DSD) data having a modulation rate m into an analog signal. The audio D/A converter includes an N-bit (N≥2) segment type D/A converter, a shift register configured to hold N bits of the DSD data, and a controller configured to supply an N-bit output code containing α×n (where a is a constant satisfying 1<α≤1/m) 1s to the segment type D/A converter when the number of 1s contained in the shift register is n.

The N bits extracted from the DSD data having the modulation rate of m contain N×m 1s at most. The N-bit output code supplied to the N-bit segment type D/A converter contains N×m×α 1s at most, and a signal level can be increased by a times.

In some embodiments, the controller may include a counter configured to acquire the number n of 1s contained in the shift register, a multiplier configured to multiply a binary code representing the number n by a, and an encoder configured to generate an N-bit output code containing p 1s when an output of the multiplier is p.

In some embodiments, the shift register may be configured to hold N consecutive bits of DSD data.

In some embodiments, the shift register may include a first flip-flop group configured to hold N/2 consecutive bits of the DSD data, and a second flip-flop group configured to hold N/2 consecutive bits of the DSD data.

In some embodiments, when α is $2^k$ (where k is a natural number), the multiplier may be a bit shifter configured to bit-shift the binary code representing the number n by k bits to the left.

In some embodiments, when α is $2^k$ (where k is a natural number), the controller may include a counter configured to acquire the number n of 1s contained in the shift register, a bit shifter configured to bit-shift the binary code representing the number n by k bits to the left, and an encoder configured to generate an N-bit output code containing p 1s when a value represented by the binary code after bit shifting is p.

In some embodiments, the audio D/A converter may further include an additional shift register configured to hold $(\alpha-1) \times N$ bits of the DSD data (where a is a constant satisfying $1 < \alpha \le 1/m$). The controller may include a counter configured to acquire the number p of 1s contained in the shift register and the additional shift register, and an encoder configured to generate an N-bit output code containing 1s whose number corresponds to a value represented by the output of the counter.

In some embodiments, the audio D/A converter may be monolithically integrated on one semiconductor substrate. The expression "monolithically integrated" includes a case where all components of a circuit are formed on the semiconductor substrate, and a case where main components of a circuit are monolithically integrated, and some of resistors, capacitors, and the like may be provided outside the semiconductor substrate so as to adjust circuit constants. By integrating a circuit on one chip, a circuit area can be reduced and characteristics of circuit elements can be kept uniform.

EMBODIMENT

Hereinafter, preferred embodiments will be described with reference to the drawings. Identical or equivalent components, members, and processes shown in each drawing are designated by like reference numerals, and redundant explanations thereof will be omitted as appropriate. Further, the embodiments are exemplary rather than limiting the disclosure and the invention. All features and combinations thereof described in the embodiments are not necessarily essential to the present disclosure.

In the present disclosure, "a state where a member A is connected to a member B" includes a case where the member A and the member B are physically and directly connected or even a case where the member A and the member B are indirectly connected through any other member that does not substantially affect an electrical connection state between the members A and B or does not impair functions and effects achieved by combinations of the members A and B.

Similarly, "a state where a member C is connected (installed) between a member A and a member B" includes a case where the member A and the member C or the member B and the member C are indirectly connected through any other member that does not substantially affect an electrical connection state between the members A and C or the members B and C or does not impair functions and effects achieved by combinations of the members A and C or the members B and C, in addition to a case where the member A and the member C or the member B and the member C are directly connected.

First Embodiment

Figure 1:
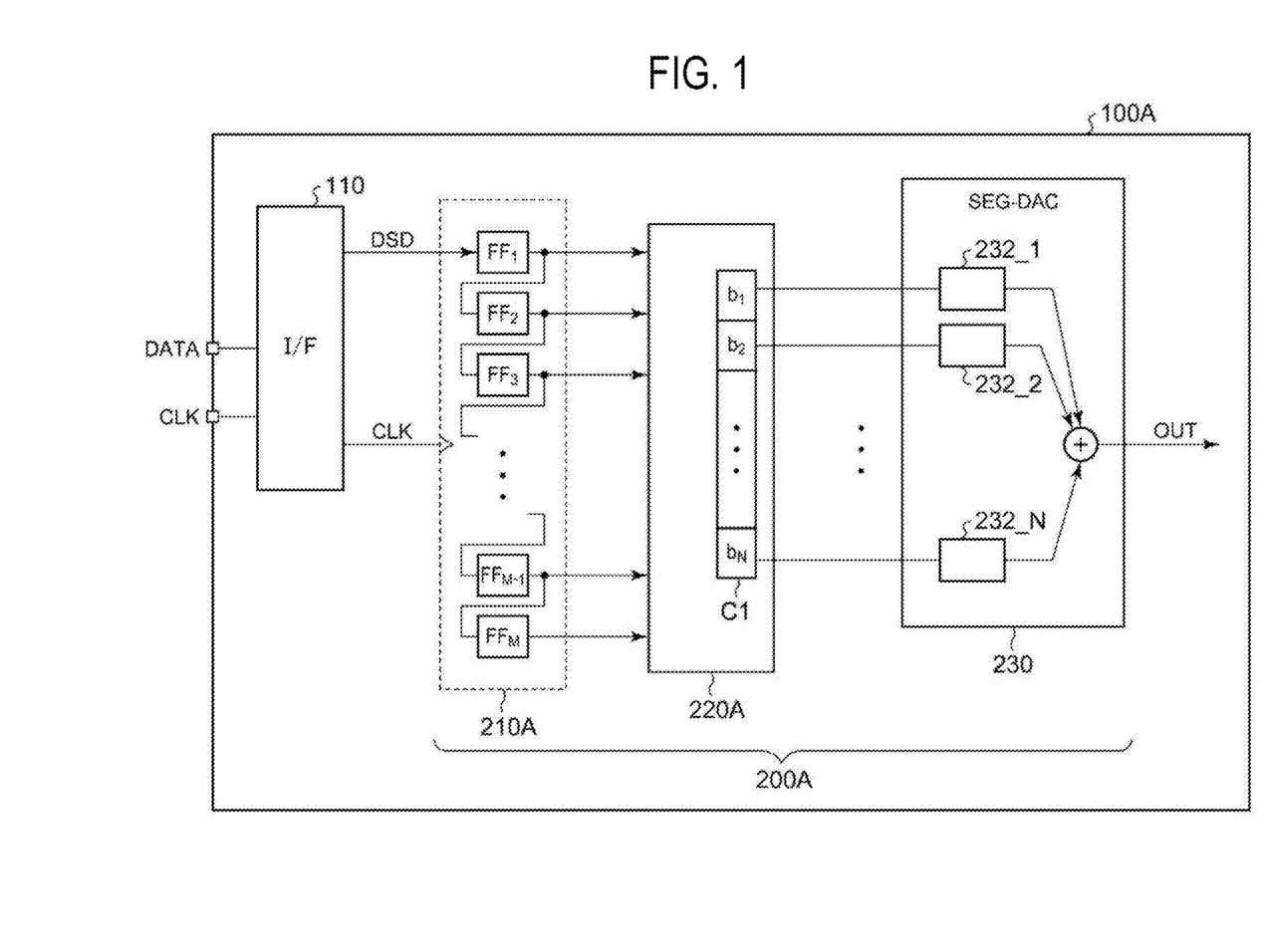
FIG. 1 is a circuit diagram of an audio circuit according to a first embodiment of the present disclosure.

FIG. 1 is a circuit diagram of an audio circuit 100A according to a first embodiment of the present disclosure. The audio circuit 100A is a DAC chip that includes an audio interface circuit 110 and a D/A converter 200A and is integrated on one semiconductor substrate.

The audio circuit 100A includes a data pin DATA and a clock pin CLK. The audio interface circuit 110 receives a DSD signal including DSD data and DSD clock CLK from an external sound source (not shown). It is assumed that a modulation rate of the DSD signal is m. Although the current standard specifies that the modulation rate m is 0.5, the present disclosure is not limited to the DSD signal with m=0.5, but may be applied to a PDM signal having any modulation rate.

The D/A converter 200A includes a shift register 210A, a controller 220A, and a segment type D/A converter 230. The segment type D/A converter 230 is, for example, a current segment type D/A converter, and includes a plurality of N current segments 232 (N≥2). The current segments 232 may be individually switched on and off, and may output a same amount of current in an on state. The currents of multiple current segments 232 are summed to generate an output signal OUT. The output signal OUT may be a current signal or may be a voltage signal obtained by converting a current signal into a voltage.

The segment type D/A converter 230 may be a switched capacitor type D/A converter. In such a case, capacitance segments are provided in place of the current segments 232.

The shift register 210A includes M flip-flops $FF_1$ to $FF_M$, and stores M adjacent bits of DSD data (where M is an integer satisfying N<M≤N/m). The DSD data is shifted bit by bit in the shift register 210A in synchronization with the DSD clock CLK. The shift register 210A may be a part of the interface circuit 110.

As an example, it is assumed that the number of bits N of the segment type D/A converter 230 is 16. Further, the modulation rate m of the DSD signal defined in the standard is 0.5. At this time, the number of bits M of the shift register 210A may be selected from the range of 16<M≤32. In the following, it is assumed that M is 32.

The controller 220A counts the number p of 1s among the M bits stored in the shift register 210A. Then, an N-bit output code C1 containing p 1s is supplied to the segment type D/A converter 230. The output code C1 contains N bits $b_1$ to $b_N$. The i-th bit $b_i$ defines the on/off operation of the i-th current segment 232_i. Specifically, when $b_i$ is 1, the current segment 232_i is turned on, and when $b_i$ is 0, the current segment 232_i is turned off.

The method of generating the output code C1 is not particularly limited. Most simply, the output code C1 may be a thermometer code in which the p bit from the end is 1 and the remaining bits are 0. However, in such a case, accuracy of the D/A converter decreases because the current segments 232 in use are biased. Therefore, the output code C1 may be generated such that 1s are evenly distributed temporally and spatially among a plurality of bits $b_1$ to $b_N$ of the output code C1. For this purpose, for example, a technique such as data weighted average (DWA) may be used.

Figure 2:
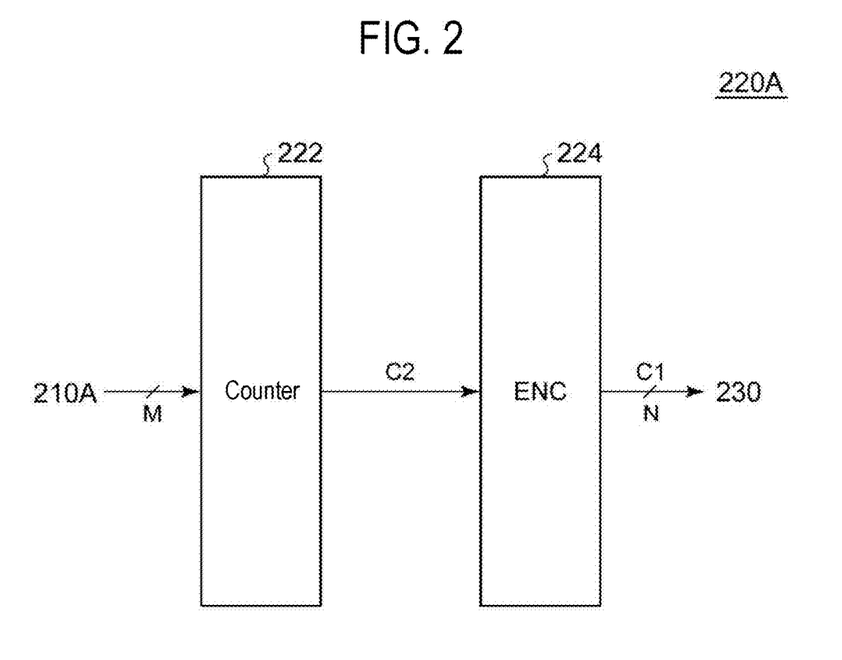
FIG. 2 is a block diagram illustrating a configuration example of a controller.

FIG. 2 is a block diagram showing an example of a configuration of the controller 220A. The controller 220A includes a counter 222 and an encoder 224. The counter 222 counts the number p of 1s stored in the shift register 210A, and generates a code C2 indicating a count value p. The encoder 224 receives the code C2 and converts the same to an output code C1.

The above is a configuration of the audio circuit 100A. Advantages of the audio circuit 100A will become apparent when compared with a comparative technique. Thus, the comparative technique will be described.

Figure 3:
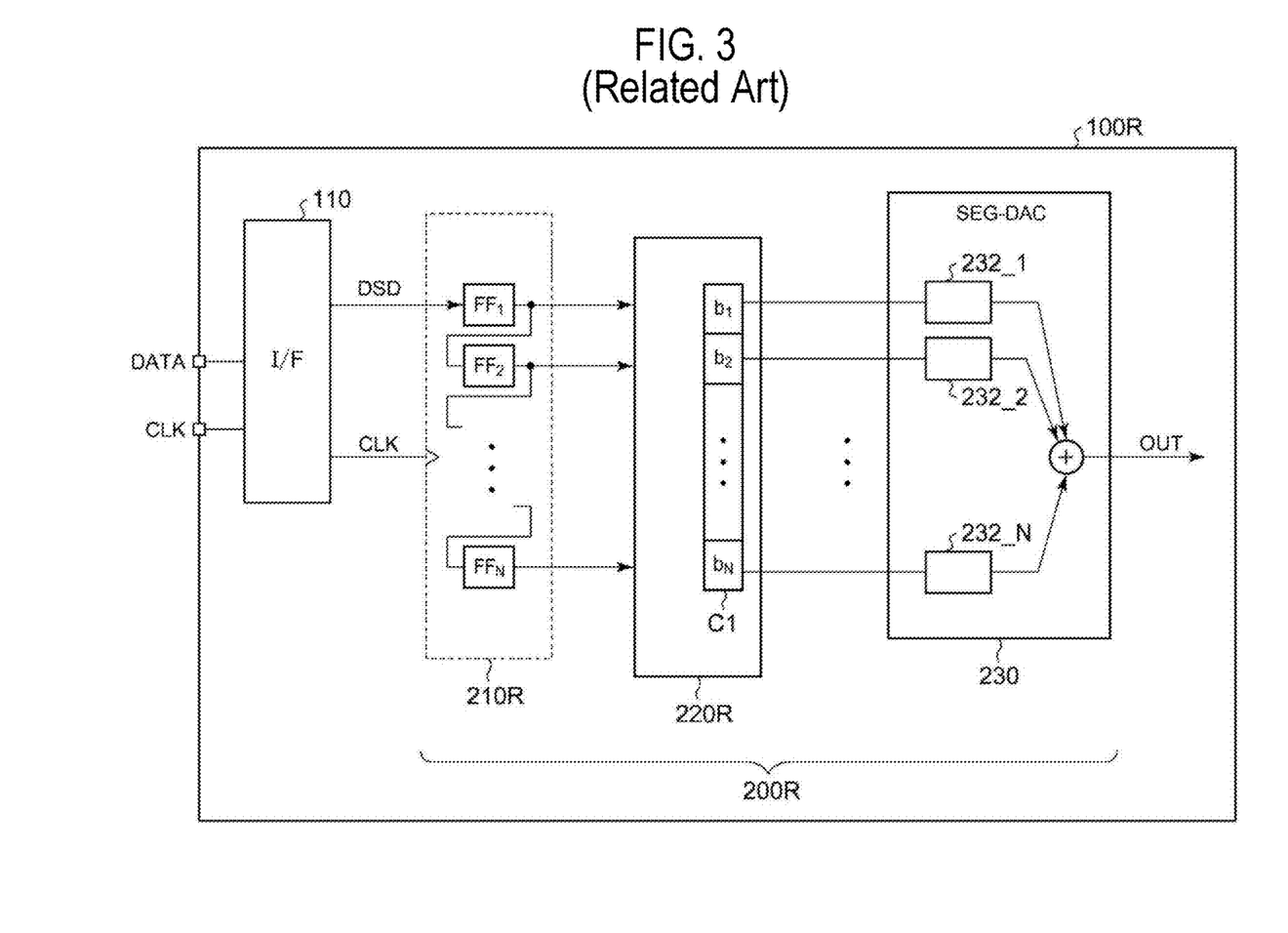
FIG. 3 is a block diagram of an audio circuit according to a comparative technique.

FIG. 3 is a block diagram of an audio circuit 100R according to a comparative technique. A D/A converter 200R includes a shift register 210R, a controller 220R, and a segment type D/A converter 230. The segment type D/A converter 230 is configured with N bits in the same manner as the segment type D/A converter 230 shown in FIG. 1.

In the comparative technique, the shift register 210R is configured with N bits, and the number of bits thereof is different from that of the shift register 210A of the first embodiment, which has M bits. The controller 220R counts the number p of 1s stored in the N-bit shift register 210R, and generates an output code C1 containing p 1s.

The above is a configuration of the D/A converter 200R. Next, an operation of the D/A converter 200R will be described.

In the D/A converter 200R, the number p of 1s among the 16 bits stored in the shift register 210R varies in the range of 0 to 8. Therefore, the number p of 1s in the N-bit output code C1 also varies within the range of 0 to 8. In other words, the output of the segment type D/A converter 230 may range from 0 to 16. When reproducing a DSD signal, the output of the segment type D/A converter 230 may vary from 0 to 8.

On the other hand, in the D/A converter 200 according to the first embodiment, the number p of 1s among the 32 bits stored in the shift register 210A varies in the range of 0 to 16. Therefore, the number p of 1s in the N-bit output code C1 also varies within the range of 0 to 16. In other words, the output of the segment type D/A converter 230 varies within the range of 0 to 16. This means that the signal level can be increased as compared to the technique in the related art.

The shift register 210A and the shift register 210R may be regarded as a moving average filter. In the first embodiment where the M-bit shift register 210A is used, a time constant of the moving average filter is longer (in other words, a cutoff frequency is lower) than that in the comparative technique. However, since the cutoff frequencies of these moving average filters are located in a noise region higher than an audible band, it may be said that their influence on a sound quality is small.

Therefore, according to the audio circuit 100A of the first embodiment, it is possible to increase the signal level of the reproduced signal while maintaining DSD native reproduction.

Next, another configuration example of the shift register 210A will be described. Although the shift register 210A shown in FIG. 1 includes M flip-flops $FF_1$ to $FF_M$ all connected in series, the present disclosure is not limited thereto.

Figure 4:
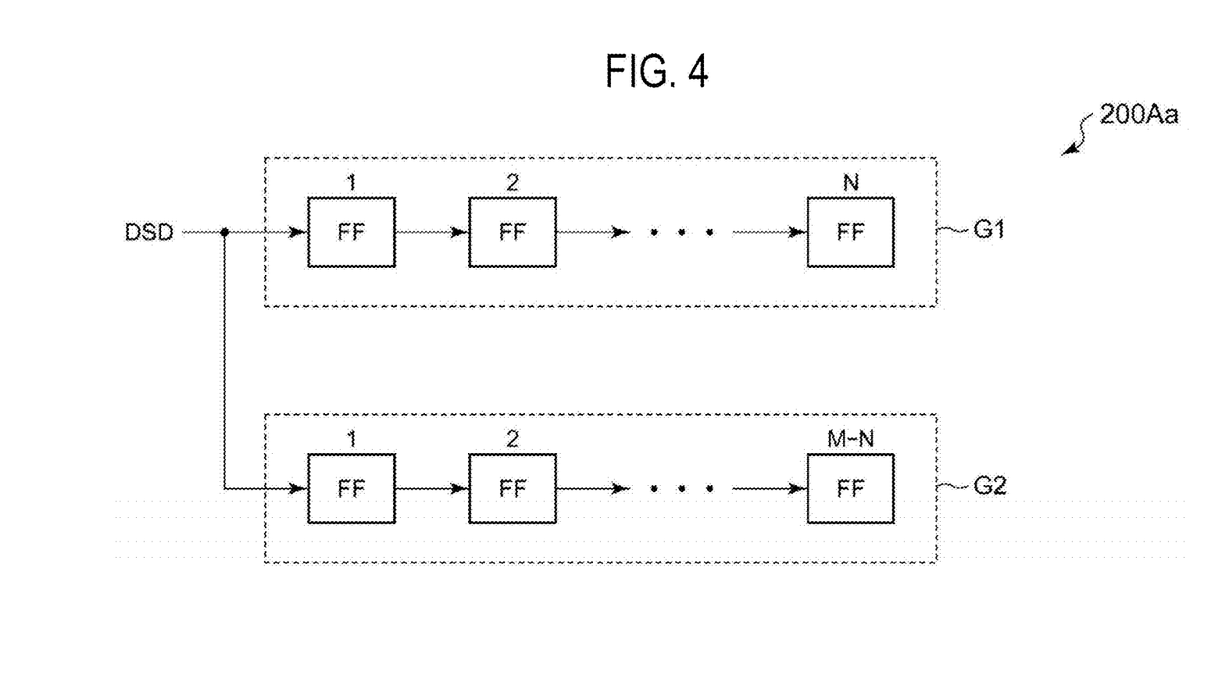
FIG. 4 is a circuit diagram of a shift register according to an example of the present disclosure.

FIG. 4 is a circuit diagram of a shift register 200Aa according to an example of the present disclosure. The shift register 210Aa includes a first flip-flop group G1 and a second flip-flop group G2. The first flip-flop group G1 includes N flip-flops FF. The second flip-flop group G2 includes M−N flip-flops FF. According to this configuration, the cutoff frequency of the filter can be made higher than that of the shift register 210A shown in FIG. 1.

Figure 5:
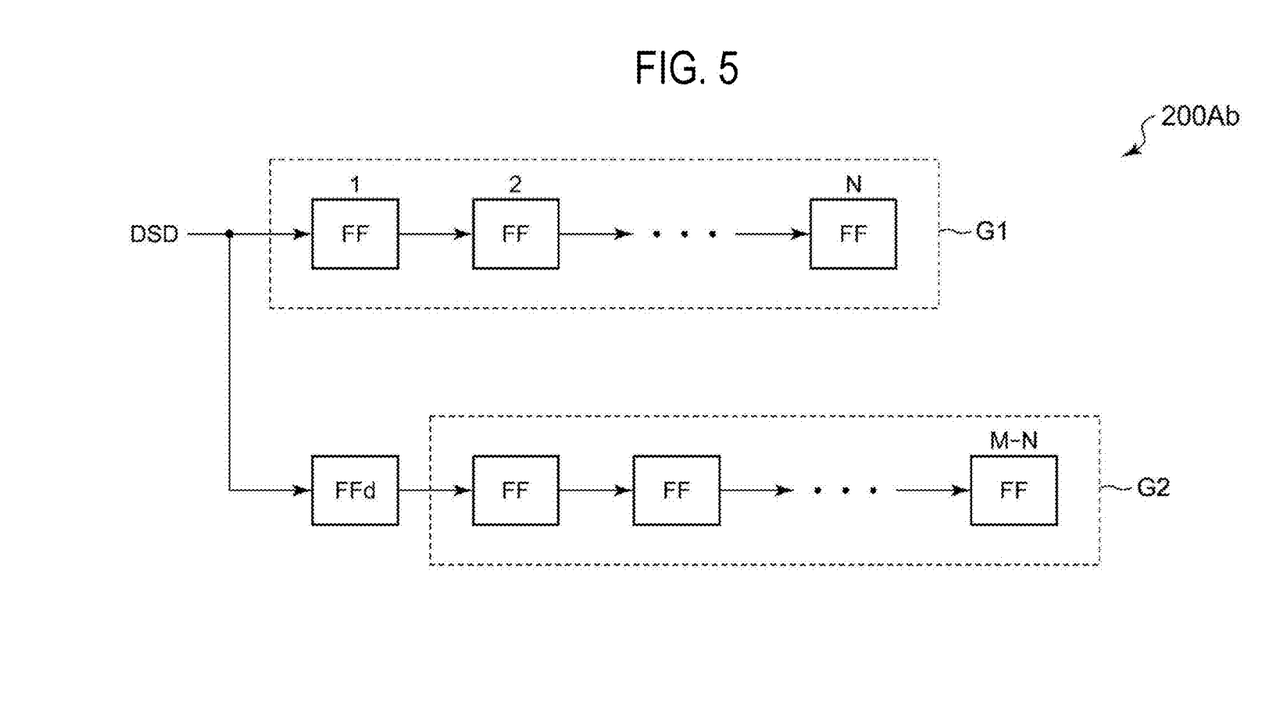
FIG. 5 is a circuit diagram of a shift register according to an example of the present disclosure.

FIG. 5 is a circuit diagram of a shift register 200Ab according to an embodiment of the present disclosure. The shift register 210Ab includes a first flip-flop group G1 and a second flip-flop group G2. The first flip-flop group G1 includes N flip-flops FF. The second flip-flop group G2 includes M−N flip-flops FF. A delay flip-flop $FF_d$ is inserted before the second flip-flop group G2, and the DSD data delayed with respect to the first flip-flop group G1 is input to the second flip-flop group G2.

Figure 6:
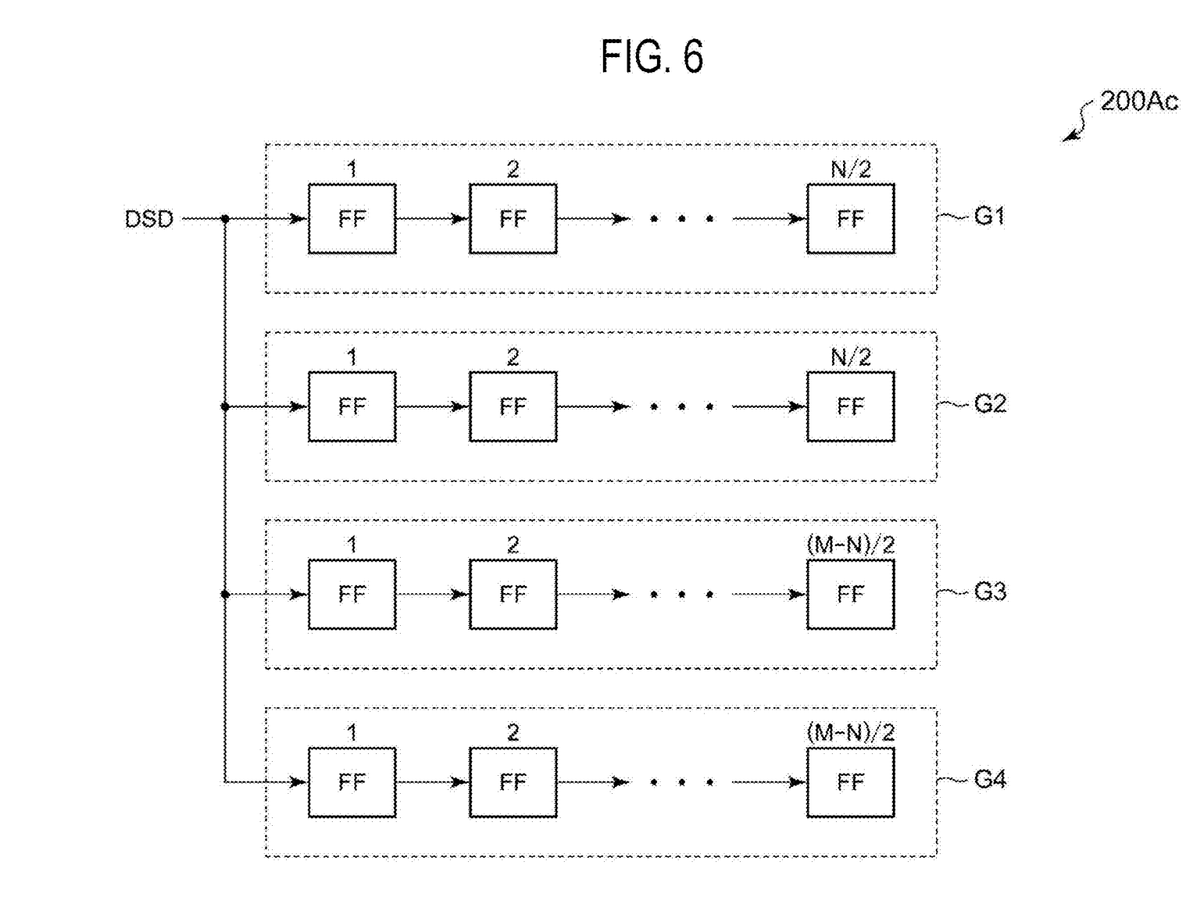
FIG. 6 is a circuit diagram showing a configuration example of a shift register.

FIG. 6 is a circuit diagram of a shift register 200Ac according to an embodiment of the present disclosure. The shift register 210Ac includes first to fourth flip-flop groups G1 to G4. Each of the first flip-flop group G1 and the second flip-flop group G2 includes N/2 flip-flops. In this configuration, each of the third flip-flop group G3 and the fourth flip-flop group G4 includes (M−N)/2 flip-flops. According to the configuration shown in FIG. 6, the cutoff frequency of the filter can be made higher than that of the shift register 210A shown in FIG. 1.

Figure 7:
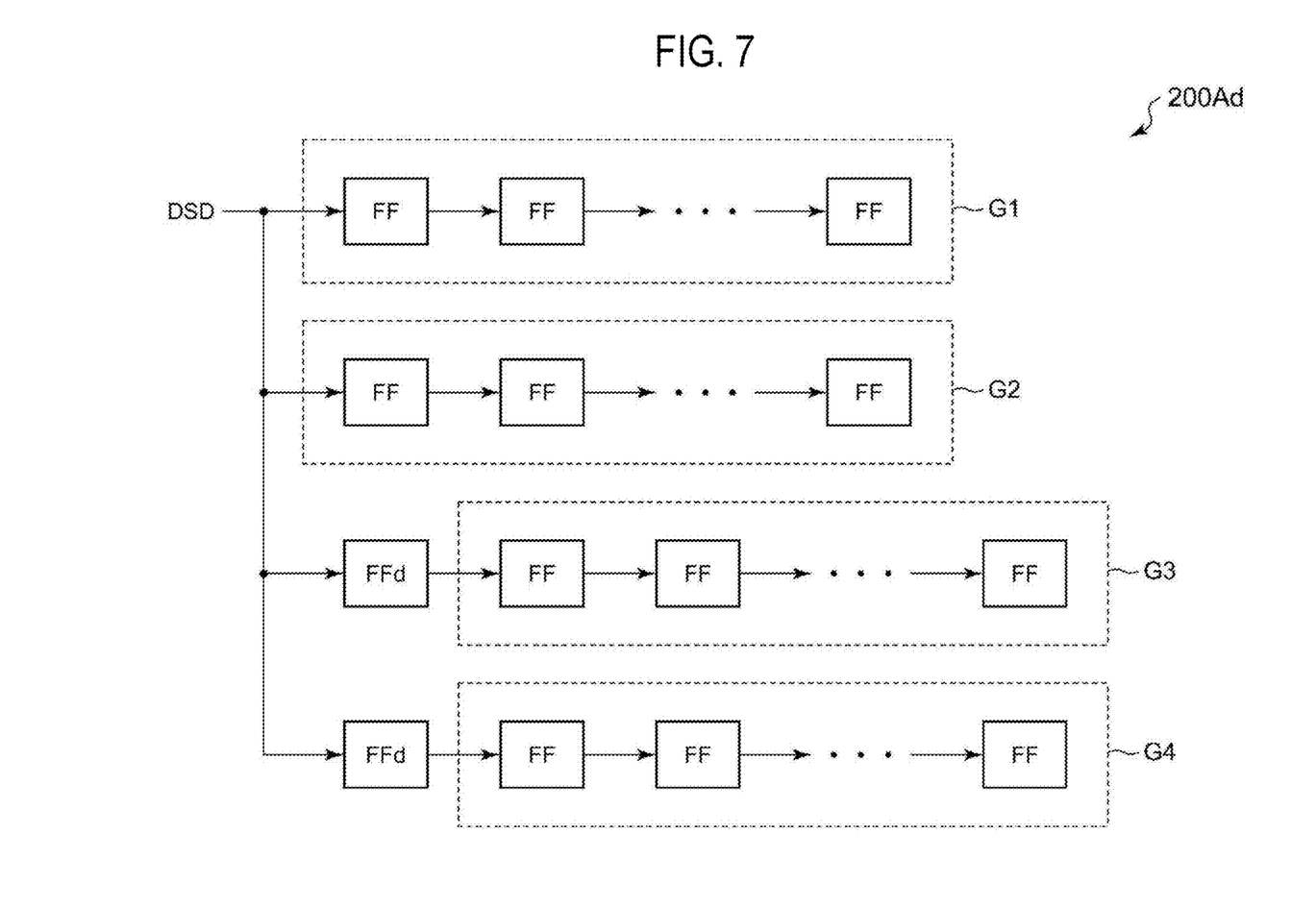
FIG. 7 is a circuit diagram showing a configuration example of a shift register.

FIG. 7 is a circuit diagram of a shift register 200Ad according to an embodiment of the present disclosure. The shift register 210Ad includes first to fourth flip-flop groups G1 to G4. Each of the first flip-flop group G1 and the second flip-flop group G2 includes N/2 flip-flops. In this configuration, each of the third flip-flop group G3 and the fourth flip-flop group G4 includes (M−N)/2 flip-flops. Delayed DSD data is input to the third flip-flop group G3 and the fourth flip-flop group G4.

The amount of delay for the first to fourth flip-flop groups G1 to G4 is not particularly limited and may be determined depending on desired filter characteristics. For example, when the input of the first flip-flop group G1 is used as a reference, DSD data may be input such that the DSD data is input to the second flip-flop group G2 while being delayed 1 clock, to the third flip-flop group G3 while being delayed 2 clocks, and to the fourth flip-flop group G4 while being delayed 3 clocks.

Second Embodiment

Figure 8:
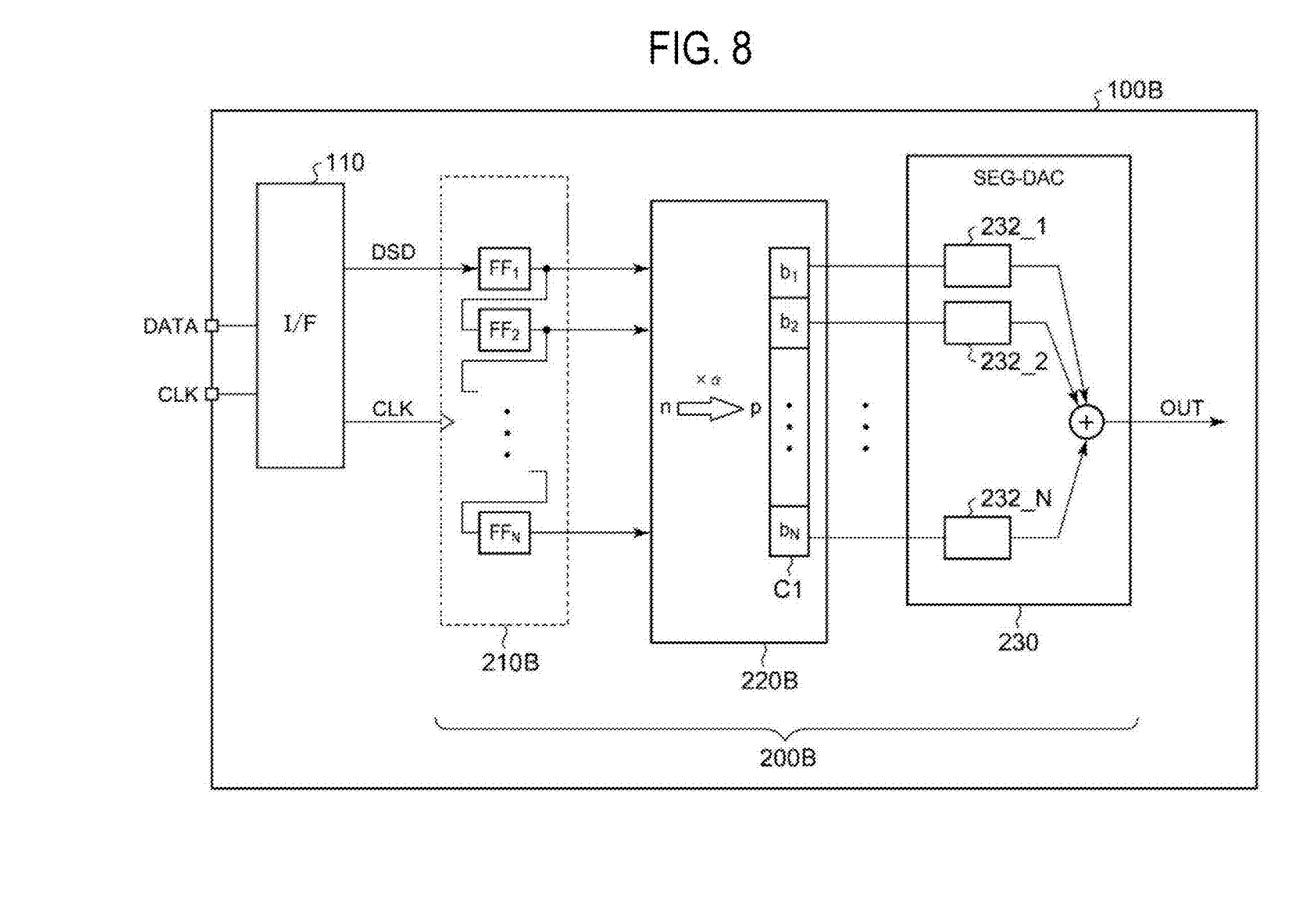
FIG. 8 is a circuit diagram of an audio circuit according to a second embodiment of the present disclosure.

FIG. 8 is a circuit diagram of an audio circuit 100B according to a second embodiment of the present disclosure. The D/A converter 200B includes a shift register 210B, a controller 220B, and a segment type D/A converter 230. The configuration of the segment type D/A converter 230 is the same as that in the first embodiment.

In the second embodiment, the number of bits N of the shift register 210B is equal to the number of bits of the segment type D/A converter 230, and N bits of DSD data are stored in the shift register 210B.

When the number of 1s contained in the shift register 210 is n, the controller 220B generates an N-bit output code C1 containing $p = \alpha \times n$ (where α is a constant satisfying $1 < \alpha \le 1/m$) 1s and supplies the N-bit output code C1 to the segment type D/A converter 230. Here, a may be a fraction or a decimal. In such a case p is an integer obtained by rounding α×n.

The above is a configuration of the D/A converter 200B. Next, an operation thereof will be described.

In the D/A converter 200B, the number n of 1s among the 16 bits stored in the shift register 210B varies in the range of 0 to 8. In the controller 220B, the value p obtained by multiplying the number n by α, i.e., the number of current segments turned on among the current segments 232_1 to 232_N of the segment type D/A converter 230B, ranges from 0 to 8α. Since α>1, according to the D/A converter 200B, in the same manner as in the first embodiment, the signal level of the output signal OUT can be made higher than that of the comparative technique.

In the second embodiment, since the number of bits of the shift register 210B is equal to that of the comparative technique, the time constant of the moving average filter is equal to that of the comparative technique.

Figure 9:
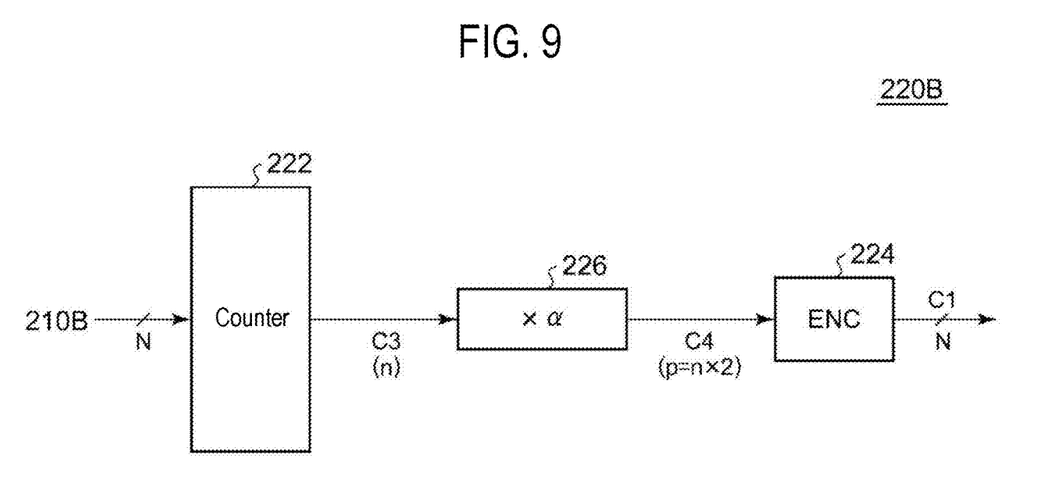
FIG. 9 is a block diagram illustrating a configuration example of a controller in FIG. 8.

Next, a configuration example of the controller 220B according to the second embodiment will be described.

FIG. 9 is a block diagram showing a configuration example of the controller 220B. The controller 220B includes a counter 222, a multiplier 226, and an encoder 224. The counter 222 counts the number n of 1s contained in the N-bit shift register 210B, and generates a binary code C3 indicating the count value n. The multiplier 226 multiplies the code C3 by a constant α to generate a code C4. The encoder 224 receives the code C4 and generates an N-bit output code C1 containing p 1s.

When α is $2^k$ (where k is a natural number), the multiplier 226 may be configured with a bit shifter configured to bit-shift the binary code C3 by k bits to the left. The binary code C4 after the bit shifting represents p which is n multiplied by $2^k$.

In FIG. 8, the shift register 210B is configured with N flip-flops FF connected in series. However, the present disclosure is not limited thereto. For example, as shown in FIG. 6, the shift register 210B may be configured by a combination of a first shift register group G1 including N/2 flip-flops and a second shift register group G2 including N/2 flip-flops. In this case, the second shift register group G2 may receive the same DSD data as in the first shift register group G1, or may receive DSD data delayed with respect to the input to the first shift register group G1.

Although the embodiments according to the present disclosure have been described by using specific terms, this description is nothing more than an example presented to aid understanding, and is not intended to limit the scope of the present disclosure or the claims. The scope of the present disclosure is defined by the claims. Therefore, embodiments, examples, and modifications not described herein are also included in the scope of the present disclosure.

(Supplementary Note)

The following technique is disclosed in this specification.

(Item 1) An audio D/A converter for converting direct stream digital (DSD) data having a modulation rate m into an analog signal, comprising:
an N-bit (N≥2) segment type D/A converter;
a shift register configured to store M-bits (N<M≤N/m) of the DSD data; and
a controller configured to supply an N-bit output code containing p 1s to the segment type D/A converter when the number of 1s stored in the shift register is p.

(Item 2) The audio D/A converter of Item 1, wherein m is 0.5, N is 16, and M is 32.

(Item 3) The audio D/A converter of Item 1 or 2, wherein the shift register includes M flip-flops connected in series.

(Item 4) The audio D/A converter of Item 1 or 2, wherein the shift register includes N flip-flops connected in series and (M−N) flip-flops connected in series.

(Item 5) The audio D/A converter of Item 2, wherein the shift register includes a first flip-flop group including N flip-flops connected in series to receive the DSD data, and a second flip-flop group including N flip-flops connected in series to receive the DSD data.

(Item 6) The audio D/A converter of Item 2, wherein the shift register includes a first flip-flop group including N/2 flip-flops connected in series to receive the DSD data, a second flip-flop group including N/2 flip-flops connected in series to receive the DSD data, a third flip-flop group including N/2 flip-flops connected in series to receive the DSD data, and a fourth flip-flop group including N/2 flip-flops connected in series to receive the DSD data.

(Item 7) The audio D/A converter of Item 6, wherein in the shift register, at least one selected from the group of the first flip-flop group to the fourth flip-flop group is configured to receive delayed DSD data.

(Item 8) An audio D/A converter for converting direct stream digital (DSD) data having a modulation rate m into an analog signal, comprising:
an N-bit (N≥2) segment type D/A converter;
a shift register configured to hold N bits of the DSD data; and
a controller configured to supply an N-bit output code containing α×n (where a is a constant satisfying 1<α≤1/m) 1s to the segment type D/A converter when the number of 1s contained in the shift register is n.

(Item 9) The audio D/A converter of Item 8, wherein the controller includes a counter configured to acquire the number n of 1s contained in the shift register, a multiplier configured to multiply a binary code representing the number n by α, and an encoder configured to generate an N-bit output code containing p 1s when an output of the multiplier is p.

(Item 10) The audio D/A converter of Item 9, wherein when α is $2^k$ (where k is a natural number), the multiplier is a bit shifter configured to bit-shift the binary code representing the number n by k bits to the left.

(Item 11) The audio D/A converter of any one of Items 8 to 10, wherein the shift register is configured to hold N consecutive bits of the DSD data.

(Item 12) The audio D/A converter of any one of Items 8 to 10, wherein the shift register includes a first flip-flop group configured to hold N/2 consecutive bits of the DSD data, and a second flip-flop group configured to hold N/2 consecutive bits of the DSD data.

(Item 13) The audio D/A converter of any one of Items 1 to 12, which is monolithically integrated on one semiconductor substrate.

(Item 14) A method of converting direct stream digital (DSD) data having a modulation rate m into an analog signal, comprising:
counting a number p of 1s contained in M consecutive bits (N<M≤N/m) of the DSD data;
generating an N-bit output code containing p 1s; and
converting the N-bit output code into the analog signal by an N-bit segment type D/A converter.

(Item 15) A method of converting direct stream digital (DSD) data having a modulation rate m into an analog signal, comprising:
 counting a number n of 1s contained in N bits of the DSD data;
 generating an N-bit output code containing α×n (where a is a constant satisfying 1<α≤1/m) 1s; and
 converting the N-bit output code into the analog signal by an N-bit segment type D/A converter.

While certain embodiments have been described, these embodiments have been presented by way of example only, and are not intended to limit the scope of the disclosures. Indeed, the embodiments described herein may be embodied in a variety of other forms. Furthermore, various omissions, substitutions, and changes in the form of the embodiments described herein may be made without departing from the spirit of the disclosures. The accompanying claims and their equivalents are intended to cover such forms or modifications as would fall within the scope and spirit of the disclosures.

What is claimed is:

1. An audio digital-to-analog (D/A) converter for converting direct stream digital (DSD) data having a modulation rate m into an analog signal, comprising:
 an N-bit (N≥2) segment type D/A converter;
 a shift register configured to store M-bits (N<M≤N/m) of the DSD data; and
 a controller configured to supply an N-bit output code containing p 1s to the segment type D/A converter when the number of 1s stored in the shift register is p.

2. The audio D/A converter of claim 1, wherein m is 0.5, N is 16, and M is 32.

3. The audio D/A converter of claim 1, wherein the shift register includes M flip-flops connected in series.

4. The audio D/A converter of claim 1, wherein the shift register includes N flip-flops connected in series, and (M−N) flip-flops connected in series.

5. The audio D/A converter of claim 2, wherein the shift register includes a first flip-flop group including N flip-flops connected in series to receive the DSD data, and a second flip-flop group including N flip-flops connected in series to receive the DSD data.

6. The audio D/A converter of claim 2, wherein the shift register includes a first flip-flop group including N/2 flip-flops connected in series to receive the DSD data, a second flip-flop group including N/2 flip-flops connected in series to receive the DSD data, a third flip-flop group including N/2 flip-flops connected in series to receive the DSD data, and a fourth flip-flop group including N/2 flip-flops connected in series to receive the DSD data.

7. The audio D/A converter of claim 6, wherein in the shift register, at least one selected from the group of the first flip-flop group to the fourth flip-flop group is configured to receive delayed DSD data.

8. An audio digital-to-analog (D/A) converter for converting direct stream digital (DSD) data having a modulation rate m into an analog signal, comprising:
 an N-bit (N≥2) segment type D/A converter;
 a shift register configured to hold N bits of the DSD data; and
 a controller configured to supply an N-bit output code containing α<n (where o is a constant satisfying (1<α≤1/m) 1s to the segment type D/A converter when the number of 1s contained in the shift register is n.

9. The audio D/A converter of claim 8, wherein the controller includes a counter configured to acquire the number n of 1s contained in the shift register, a multiplier configured to multiply a binary code representing the number n by α, and an encoder configured to generate an N-bit output code containing p 1s when an output of the multiplier is p.

10. The audio D/A converter of claim 9, wherein when α is $2^k$ (where k is a natural number), the multiplier is a bit shifter configured to bit-shift the binary code representing the number n by k bits to the left.

11. The audio D/A converter of claim 8, wherein the shift register is configured to hold N consecutive bits of the DSD data.

12. The audio D/A converter of claim 8, wherein the shift register includes a first flip-flop group configured to hold N/2 consecutive bits of the DSD data, and a second flip-flop group configured to hold N/2 consecutive bits of the DSD data.

13. The audio D/A converter of claim 1, which is monolithically integrated on one semiconductor substrate.

14. A method of converting direct stream digital (DSD) data having a modulation rate m into an analog signal, comprising:
 counting a number p of 1s contained in M consecutive bits (N<M≤N/m) of the DSD data;
 generating an N-bit output code containing p 1s; and
 converting the N-bit output code into the analog signal by an N-bit segment type D/A converter.

* * * * *